Dec. 22, 1970   S. L. CASALINA   3,549,510
POLYMER-TREATED IRRADIATED BENDABLE SHEETS OF
LIGNO-CELLULOSE AND METHOD OF MAKING SAME
Filed June 12, 1967

INVENTOR:
SAMUEL L. CASALINA
BY: Warren, Milmore,
Cypher, Rubin & Brucker
ATTORNEYS United States Patent Office 3,549,510
Patented Dec. 22, 1970

3,549,510
POLYMER-TREATED IRRADIATED BENDABLE
SHEETS OF LIGNO-CELLULOSE AND METHOD
OF MAKING SAME
Samuel L. Casalina, Watsonville, Calif., assignor to
Di Giorgio Corporation, a corporation of Delaware
Filed June 12, 1967, Ser. No. 645,293
Int. Cl. B01j 1/10; C08b 15/00
U.S. Cl. 204—159.12
6 Claims

ABSTRACT OF THE DISCLOSURE

Sheet material of ligno-cellulose, such as fiberboard, and tissue is impregnated at least at the surface with a liquid monomer having a radiation-activatable reactive group and which polymerizes to form a flexible polymer, and subjected to ionizing radiation to polymerize the monomer, thereby producing a composite which has a continuous resinous coating which gives the sheet increased strength while retaining yieldability, e.g., producing a sheet which is bendable without cracking.

---

The invention relates to the treatment of liquid-absorbent sheet material which is formed from ligno-cellulose and is yieldable, e.g., bendable, with a material to increase the strength of the material without destroying its yieldable characteristics. For example, the invention can be applied to the treatment of such bendable or limp materials as fiberboard, corrugated fiberboard, and tissue.

In all of the applications, the treatment results in a new product which has greater strength than the original sheet material, reduced tendency to absorb moisture, and improved durability, such as wear and abrasion resistance.

One of the major uses of wood pulp in the world is the production of particle board, such as fiberboard, cardboard, bristol board and tissue. A great variety of such particle board is produced for varied uses and such products are known by a variety of trade and descriptive names. Essentially, they all are made of shredded ligno-cellulose material which is largely fibrous and is cemented together by various binders, including glues, and rolled or pressed to desired thickness. The process of manufacture varies with the ultimate use of the product. The fabrication of containers and boxes from fiberboard is a major industry in the United States and accounts for the utilization of a large proportion of the pulp produced from trees.

Among the disadvantages of the characteristics of particle boards produced currently when used, for example, in fiberboard construction are: Limited strength (especially bursting and compressive deformation or corrugations in fiberboard), poor weathering propeties (i.e., tendency to absorb moisture and become soggy), and low abrasive resistance.

It is known to treat natural or regenerated cellulose textiles with a crease-resistant resin by irradiating the textile after impregnation with a condensible chemical, using a controlled radiation and effect condensation or grafting to the fibers. However, in such processes it is important to preserve the softness or "feel" of the textile and maintain its outward porosity. Also, swelling of the textile or other substrate is a frequent concommitant of such processes. Further, it is known to produce a hard surface in flexible resinous compositions, such as floor coverings, by irradiation; the product can thereafter not be bent without cracking it. Finally, it is known to impregnate wood with a monomer and polymerizing the monomer within the cells to stabilize the wood against deformation; the product cannot be bent.

The instant invention is, in contrast, concerned with treating bendable, liquid absorbent sheet material consisting principally of ligno-cellulose with a material which will preserve flexibility while affording increased strength and wear resistance. In another aspect, the invention provides a new product.

In summary, according to the invention flexible liquid-absorbent sheet material is impregnated at least at its surface with a liquid monomer which has a radiation-activatable reaction group and polymerizes under ionizing radiation to form a flexible polymer, and the monomer is polymerized by such radiation to provide a continuous polymer surface.

The treatment is applied to materials such as fiberboard, either single-ply or corrugated board, or tissue, having some porosity, whereby some of the liquid monomer enters the body of the sheet and only a thin film remains on the surface. "Porosity" is used herein to denote a structure in which liquid can penetrate beneath the surface. When the treatment is applied to corrugated board, which includes two flat outer or surface layers by an adhesive, the treatment may be applied to only one or both of the exposed surfaces of the outer layers, or, if desired, also to the corrugated layer; however, in the last instance, the spaces between the outer layers and the corrugated layer are not filled with the liquid, whereby flexibility of the final sheet is not destroyed.

When the process is applied to tissue, such as paper facial tissue having a low tear strength, e.g., below 100 grams, the tissue acts principally as a base to hold the monomer, and the polymerized product completely encloses the tissue, resulting in a flexible sheet of high tear strength.

The term "tear strength" is used herein to denote the tension required to rupture a sheet, stretched flatly in a continuous rectangular 10-centimeter square frame, by pulling through it a bead 6 mm. (millimeter) in diameter which is at the end of a wire 1 mm. in diameter and passing through the center of the sheet, the tension being that applied to the wire.

The invention is further illustrated in the accompanying drawing forming a part of this specification, wherein.

Figure 1:
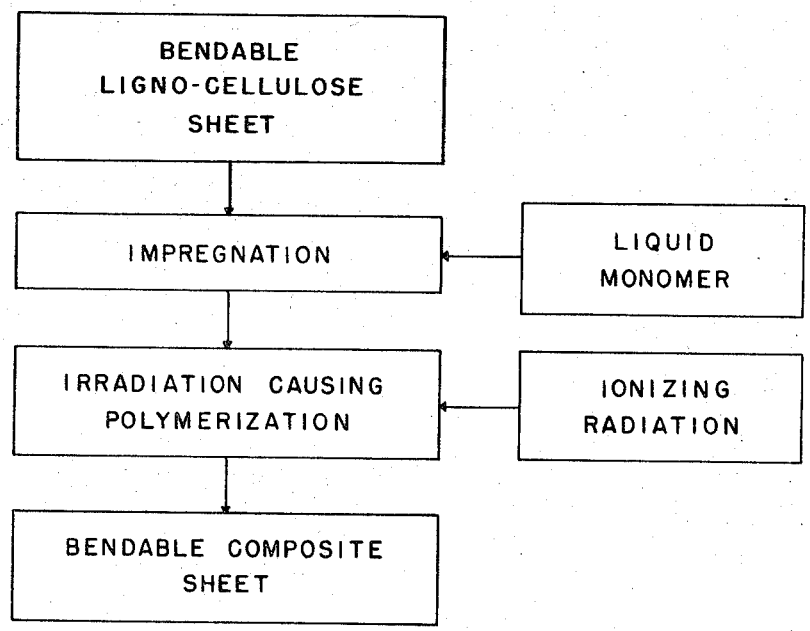
FIG. 1 is a schematic representation of the steps according to the invention.
Figure 3:
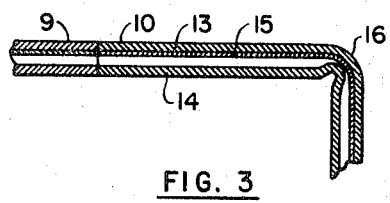
FIGS. 3 and 4 are fragmentary sectional views, shown to an enlarged scale, taken on the correspondingly numbered section lines of FIG. 2.
Figure 4:
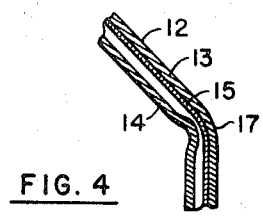
Figure 2:
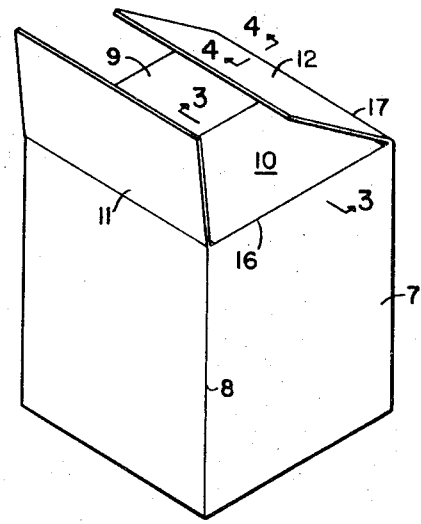
FIG. 2 is an isometric view of a carton formed of corrugated fiber board treated according to the invention.

Referring to FIG. 1, the initial sheet material is impregnated with the liquid monomer in any desired manner, as by immersing the sheet in a pool of the monomer, if desired by pulling a continuous band thereof through the pool beneath one or more immersed rollers, or by spraying the liquid monomer on the sheet or onto an article formed from fiberboard prior to treatment, such as a carton as illustrated in FIGS. 2–4. The liquid monomer is absorbed by at least the surface portion of the sheet and usually by the entire sheet.

The term "liquid monomer" includes any material which has a radiation-activatable reaction group and which, when subjected to ionizing radiation, polymerizes to form a flexible polymer, and includes monomers that can be liquefied by solution in a solvent. For the purposes of this invention, a sheet of polymer is called "flexible" if a sheet 0.5 mm. in thickness can be given a 90° bend without rupture with a torque of less than 640 centimeter-grams per linear centimeter of the bent edge under the following conditions: A strip of the polymer sheet 25 mm. in width and at least twice as long is clamped near one end between flat plates, at least one providing a 90° edge; the sheet is also clamped by transverse clamps at a distance of 25 mm. from the plates, and a force to bend the sheet is there applied. A force of 4,000 grams applied at this point produces the above-stated torque. The test strip can, for example, be formed by impregnating a sheet of tissue, as will be described in connection with FIGS. 5 to 6.

Examples of monomers having radiation-activatable reaction groups are given in the U.S. patent to Kenaga, No. 3,077,417, and the description of the several types of monomers therein given by structural chemical formular are incorporated herein by reference. However, not all of those monomers, when used alone, are suitable for the present invention, which is limited to the use of those that produce flexible polymers in sheet form.

Among the monomers especially useful in the present invention are the esters of acrylates, methacrylates and ethacrylates represented by the structural chemical formula

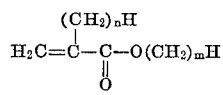

wherein $n$ is an integer from 0 to 2 and $m$ is an integer from 1 to 4, both inclusive. Although these monomers can, in general, be used, it is not possible to use all of them alone. For example, methyl methacrylate alone is to stiff to meet the test given above; however, a blend consisting of 45% by weight of methyl methacrylate and 55% by weight of ethyl acrylate is suitable.

To illustrate the flexibilities noted above, a control corrugated fiberboard was bent through 90° about a metal pin 1 mm. in diameter and the torque per linear centimeter was measured. Other specimens of the same fiberboard were then treated with the several monomers stated in the following table by immersion in a pool to saturate both the outside and corrugated layers, and subjected to ionizing radiation to polymerize the monomer. The bending torque per linear centimeter was determined for each treated specimen and divided by the torque for the control. The ratios were:

TABLE I

| Monomer: | Ratio of torques of irradiated to control specimen |
| --- | --- |
| Methyl methacrylate | 5.4 |
| Ethyl acrylate | 1.8 |
| Butyl methacrylate | 2.3 |
| 45% methyl methacrylate+55% ethyl acrylate | 3.1 |

It is evident that blends of monomers can be used to advantage to achieve the desired degree of flexibility; and that ethyl acrylate is very flexible while butyl methacrylate is only moderately flexible.

For example, it is possible to use blends containing from 20% to 80% of either monomer and from 80% to 20% of the other. Thus, for treating corrugated fiberboard one can use the blend stated in the last line in Table I, and when greater flexibility is desired, as for 1/16" bristol board, a blend of 70% ethyl acrylate and 30% methyl methacrylate or, for stiffer particle board, a blend of 80% butyl methacrylate and 20% methyl methacrylate.

Advantageously, a polymerization promoter or accelerator, such as $CCl_4$ is included in the liquid monomer in an amount equal to at least 5% and, preferably, not over 30% by weight of the monomer. It was found that such an additive hastens polymerization and reduces the amount of ionizing radiation required. For example, from 8% to 11% by weight of $CCl_4$ can be included in the above-mentioned compositions.

As indicated in FIG. 1, the impregnated fiberboard is subjected to ionizing radiation. It is desirable to effect radiation in the absence of any or of large amounts of water moisture oxygen or other oxidizing material because moisture, oxygen and the like retard the polymerization. This may be achieved, for example, by enclosing the monomer-moistened sheet in a plastic bag or by working in an inert atmosphere. For example, the radiation chamber may be purged with nitrogen after introduction of the sheet.

Any form of high-intensity ionizing radiation may be used, and may consist of or include in significant amounts electromagnetic radiations, also called gamma rays (of which X-rays are an example), preferably having wave lengths between 0.01 and 15 A. The radiation may, alternatively or additionally, consist of or include significant amounts of electrons, sometimes electron rays, preferably having energies between about $10^{-3}$ and 15 mev., and beta rays having energies between 0.5 and 15 mev.

The radiation source may be a radionuclide or an electronic device, such as an X-ray tube, a linear accelerator, or a Van de Graaf or a dynamitron-type machine. Radionuclides such as a cobalt 60, irridium 192, and cesium 137, may be formed as a byproduct of nuclear reactory operations, or the elemental metal, such as cobalt 59, may be subjected to neutron bombardment to form radioactive cobalt 60. The resulting radioactive cobalt emits gamma rays with energies of 1.7 and 1.33 mev. and has a half-life of 5.3 years. Beta rays, consisting of electrons of nuclear origin, may be used by employing as a source of material such as strontium 90, possessing sufficient energy to cause ionization to an economically significant depth into the monomer-treated sheet.

The irradiation is such that the total absorbed radiation dose is between about 1.0 and 4.5 megarads of penetrating ionizing radiation. The unit of radiation "megarad" is used herein to denote that quantity of radiation which imparts the abosrbed dose of one million rad to each gram of irradiated product. One rad indicates that 100 ergs of energy have been imparted to each gram of irradiated material, so that one megarad represents the absorption of $10^8$ ergs per gram. The radiation dose is, in any specific instance, such as to cause at least 70% and preferably 100%, polymerization.

Typically, the radiation is continued for a period of about 20 minutes to 4 hours, in accordance with the radiation intensity and a radiation time of two hours has been found to be possible when working with an experimental 11,000 curie cobalt 60 source. This time can be reduced substantially with more intense sources, such as plants of commercial size containing radioisotopes or utilizing the principle of electron acceleration.

Radiation can be effected at ambient or slightly elevated temperature and any desired pressure. Although this is a "cold" polymerization in that no heat is added to the reaction, some rise in temperature occurs, principally while the polymerization passes from 30% to 100%, because the reaction is exothermic.

The irradiated sheet is bendable, i.e., it can be bent through a 90° bend without failure. The torque required to effect bending may be greater than that given above in defining flexible polymer sheets, especially if thick or corrugated fiberboards are involved. However, when tissue is impregnated the resulting sheet can be bent with a very low torque.

Referring to FIGS. 2–4, there is shown a carton 7 of corrugated fiberboard formed by bending vertical edges 8 after treatment according to the invention. The fiberboard may, for example, be 1.5 mm. thick. The carton includes closure flaps 9, 10, 11 and 12, of which the first two are shown closed. As appears in FIGS. 2 and 3, in this embodiment the rugations are vertical in the carton sides, the fiberboard consisting of outer fiberboard layers 13 and 14 both bonded by adhesive to a corrugated spacer 15. These flaps are bent along hinge lines 16 and 17 relatively to the vertical walls of the carton. It is evident that the corrugated layer 15 is crushed slightly at the lines 16 and 17 to permit bending. When the hinge lines extend parallel to the rugations less torque is required to bend the board.

Figure 5:
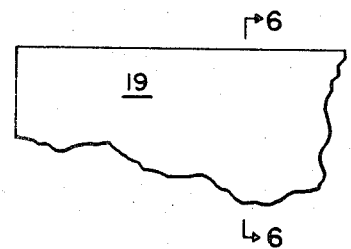
FIG. 5 is a fragmentary plan of a sheet formed by using tissue as the base material.
Figure 6:
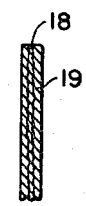
FIG. 6 is a section, shown to an enlarged scale, taken on the line 6—6 of FIG. 5.

Referring to FIGS. 5 and 6, low tear-strength paper tissue 18 is heavily impregnated in the liquid monomer, e.g., by placing it into a pan containing the liquid monomer. The tissue serves principally as a base to hold the liquid. The impregnated sheet is then polymerized, either separately or in the pan, causing the liquid to polymerize to form a film 19. The film has a tear strength many times that of the tissue. For example, the original tissue may have a tear strength of 30 grams and the film, if 0.7 mm. in thickness, a tear strength of 1,500 grams. Typically, such films have thicknesses between about 0.3 and 1.5 mm. The original tissue 18 is not or is only barely discernible through the plastic; however, when the tissue bears a pattern, such as a texture or an imprint, such a pattern is visible through the translucent polymer. Such films are highly flexible or even limp, are weather-resistant, and are useful, for example, as wrapping material.

EXAMPLE I

Two specimens of single-ply fiberboard in which each layer had a thickness of 1.5 mm. were treated individually by placing them into a plastic bag, pouring the liquid monomer indicated below into the bag, sealing the bag, permitting the monomer to saturate the specimen, pouring out excess liquid and resealing the bags. The monomer liquid contained 10% $CCl_4$. The bags and contents were then placed at room temperature into an aluminum irradiation chamber, within a ring of 10 cobalt 60 rods having a total of 11,000 curies of that radionuclide. The specimens were left within the chamber until a dose of 3 megarads was delivered. The samples were removed and subjected to strength and weathering tests. The results were as shown in Table II:

TABLE II.—Results of radio-polymerization of fiberboards impregnated with liquid monomer Single-ply fiberboard

| Monomer: | Compressibility, p.s.i. |
|---|---|
| None | 83 |
| Ethyl acrylate | 130 |
| Butyl methacrylate | 194 |

Corrugated fiberboard

| None | 22 |
|---|---|
| Ethyl acrylate | 71 |
| Butyl methacrylate | 103 |

The compressibility stated is the pressure required to reduce the thickness of the fiberboard 50%.

The treated sheets had a continuous surface layer of polymer and had improved wear resistance and were resistant to moisture, such as rain.

EXAMPLE II

The effect of the treatment on tear strength, using a 6 mm. bead as previously described, is shown by the following data. In these tests various papers were tested for tear strength prior to any treatment (control) and after impregnation with ethyl acrylate containing 10% of $CCl_4$ and radiation as described for Example I. The results appear in Table III:

TABLE III.—TEAR STRENGTHS OF PAPERS

| | Grams | |
|---|---|---|
| Material | Control | Impregnated and irradiated |
| Paper towel (household) | 240 | 3,100 |
| Facial tissue (double thickness) | 170 | 2,850 |
| Paper towel (industrial) | 375 | 4,900 |

I claim:
1. The process of treating a bendable, cohesive, liquid-absorbent sheet formed from ligno-cellulose to improve its strength and durability while preserving its flexibility, which comprises the steps of:
    (a) impregnating said sheet at least to the outer portion thereof with a liquid monomer having at least about 20 percent of its components by weight selected from the group of monomers consisting of:
        (i) ethyl acrylate,
        (ii) butyl methacrylate, and
        (iii) mixtures thereof, and
    the remaining percentage of its components being selected from the group of monomers consisting of:
        (i) ethyl acrylate,
        (ii) butyl methacrylate,
        (iii) methyl methacrylate, and
        (iv) mixtures thereof; and
    (b) polymerizing said applied monomer by subjecting the sheet to ionizing radiation and thereby forming at the surface of said sheet a continuous flexible layer of resulting polymer.
2. Process according to claim 1 wherein said sheet is bendable corrugated fiberboard having a pair of flat outer layers and an intermediate corrugated layer, and wherein the step of applying the liquid monomer includes impregnating said layers with the liquid monomer without filling the spaces between said outer layers and the portions of the corrugated layer spaced therefrom.
3. A bendable sheet of fiberboard having the layers thereof formed of ligno-cellulose and impregnated with a radiation polymerized polymer by the process defined in claim 2.
4. Process according to claim 1 wherein said sheet is porous tissue having a tear strength under 100 grams.
5. A limp sheet having a tear strength above about 1 kilogram produced by the process defined in claim 4.
6. A bendable, cohesive sheet formed from a flexible ligno-cellulose base material coated in accordance with the process defined in claim 1 in order to improve the strength and durability while preserving the flexibility of said base material.

References Cited

UNITED STATES PATENTS

| 2,321,939 | 6/1943 | Quinn | 117—93.31 |
| 3,077,417 | 2/1963 | Kenaga | 204—159.12 |
| 3,374,715 | 3/1968 | Koning | 117—44 |
| 3,420,761 | 1/1969 | Feibush | 204—159.12 |

MURRAY TILLMAN, Primary Examiner

R. B. TURER, Assistant Examiner

U.S. Cl. X.R.

117—155, 93.31; 161—265, 268, 270; 260—17.4